United States Patent [19]

Conklin

[11] Patent Number: 4,635,494

[45] Date of Patent: Jan. 13, 1987

[54] INFINITELY VARIABLE TRANSMISSION AND CONTROL APPARATUS THEREFOR

[76] Inventor: Emmett D. Conklin, 2937 63rd Ave. S., St. Petersburg, Fla. 33712

[21] Appl. No.: 538,566

[22] Filed: Oct. 3, 1983

[51] Int. Cl.⁴ .................... F16H 29/08; B60K 41/12
[52] U.S. Cl. ........................................ 74/119; 74/834; 74/863
[58] Field of Search ................. 74/118, 119, 122, 831, 74/834, 863, 865, 866

[56] References Cited

U.S. PATENT DOCUMENTS

| | | | |
|---|---|---|---|
| 300,734 | 6/1884 | Preston | 74/119 X |
| 881,987 | 3/1908 | Wilber | 74/119 |
| 982,666 | 1/1911 | Girin | 74/119 |
| 1,911,156 | 5/1933 | Laing | 74/119 |
| 2,080,665 | 5/1937 | Larsen | 74/119 X |
| 2,271,795 | 2/1942 | Demarest et al. | 74/119 X |
| 2,534,093 | 12/1950 | Willard | 74/119 X |
| 2,706,914 | 4/1955 | Spence | 74/119 X |
| 3,206,991 | 9/1965 | Lines et al. | 74/119 X |
| 3,530,668 | 9/1970 | Siebers et al. | 74/866 X |
| 3,566,718 | 3/1971 | Wightman | 74/863 |
| 3,918,312 | 11/1975 | Espenschied et al. | 74/866 X |
| 4,168,638 | 9/1979 | Usui | 74/866 X |
| 4,182,203 | 1/1980 | Drury | 74/834 |
| 4,231,092 | 10/1980 | Grob et al. | 74/866 X |
| 4,428,257 | 1/1984 | Meyerle et al. | 74/866 |

FOREIGN PATENT DOCUMENTS

| | | | |
|---|---|---|---|
| 546357 | 8/1922 | France | 74/119 |
| 158568 | 12/1979 | Japan | 74/867 |
| 61858 | 4/1982 | Japan | 74/122 |
| 989227 | 4/1965 | United Kingdom | 74/863 |

Primary Examiner—Carlton R. Croyle
Assistant Examiner—Paul F. Neils
Attorney, Agent, or Firm—Remy J. VanOphem

[57] ABSTRACT

An infinitely variable transmission, method of controlling an infinitely variable transmission, and an apparatus utilizing the method. The infinitely variable transmission provides a lever or walking beam having a variable fulcrum point. Power is supplied to one end of the lever, for example by cams on a driving shaft. Power is taken from the other end of the lever by use of a rack cooperating with a gear mounted to a one-way clutch on a driven shaft. The method controlling the infinitely variable transmission includes measuring the intake manifold pressure of the internal combustion engine driving the transmission and displacing the fulcrum point of the lever in response to the measurement obtained to vary the transmission ratio. The apparatus disclosed for accomplishing this method includes a cylinder and piston assembly, the piston being interconnected with the movable fulcrum, a vacuum gage measuring intake manifold pressure and a source of pressurized fluid, and a valve selectively operable in response to the vacuum gage to pressurize the cylinder on one side of the piston.

10 Claims, 11 Drawing Figures

FIG. 1□.

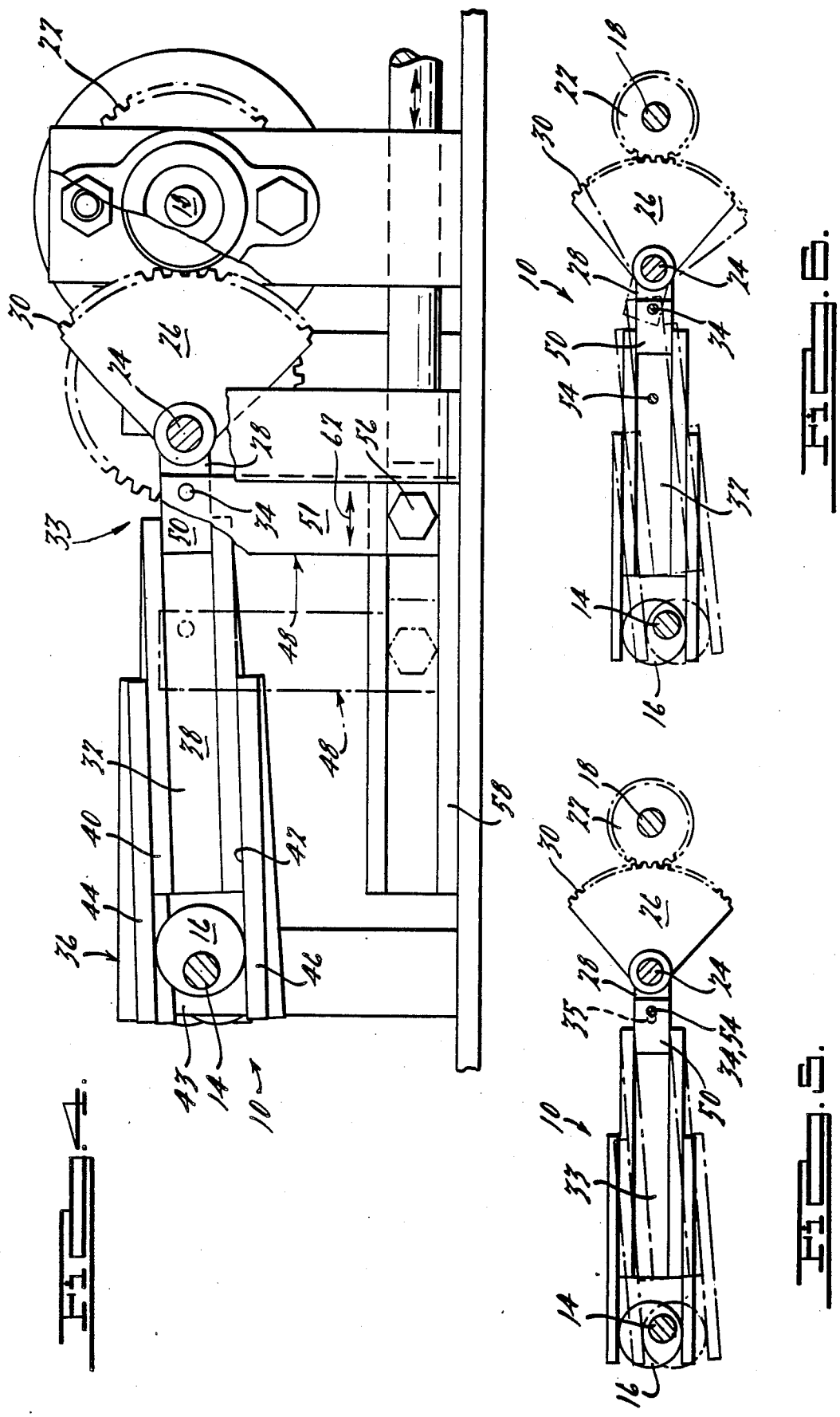

INFINITELY VARIABLE TRANSMISSION AND CONTROL APPARATUS THEREFOR

BACKGROUND OF THE INVENTION

The present invention is directed to infinitely variable transmissions and methods and apparatus for control of infinitely variable transmissions. More particularly, the present invention is directed to an infinitely variable transmission using a walking beam with a variable fulcrum and to methods and apparatuses for controlling infinitely variable transmissions in response to predetermined parameters of an internal combustion engine, such as manifold pressure.

For nearly every application where a prime mover or power source is coupled to an output device, a transmission device is required therebetween to convert the output motion of the prime mover to a form usable by the driven device. For some applications, a fixed, single speed transmission is suitable. However, for most applications, particularly for applications involving motor vehicles, multiple discrete transmission ratios are provided in order to enhance the efficiency of the prime mover while providing optimum torque or fuel economy over a wide range of speeds. However, the use of multiple discrete gear ratios in a transmission has several well known drawbacks, including a loss of power and efficiency while shifting between gear ratios. Furthermore, discretely variable transmissions, while more efficient than single speed transmissions, are still limited in their ability to efficiently couple a prime mover with a driven device.

For this reason, many continuously or infinitely variable transmissions have been designed in the past in order to overcome the disadvantages of discretely variable transmissions. These devices have taken various forms including belt driven transmissions, gear driven transmissions, and walking beams having variable fulcrums. While many continuously variable transmissions of the belt-type have been offered commercially in the past, such devices have had limited commercial success in the past, due partially to a loss of efficiency resulting from belt slippage, the cost, weight and space requirements of such tranmissions, and the slow responsiveness of such transmissions to changing conditions.

An example of a power transmission device of the variable fulcrum walking beam type is disclosed in U.S. Pat. No. 982,666, to Girin. Girin teaches a change speed gear having a driving and a driven shaft, a lever connected to the driving shaft and a clutch mechanism engaging the driven shaft and connected to the other end of the lever. A movable fulcrum is provided intermediate the two ends of the lever. The fulcrum is displaced to vary the ratio between the rotational speed of the drive shaft to the driven shaft. Girin, however, uses a complicated and space consuming series of cranks to transfer power to and from the lever. Furthermore, Girin nowhere provides for an automatic means controlling the position of the fulcrum. Additionally, the device in Girin is intended to permit selection of the output speed by movement of the fulcrum point, while permitting the motor to run at any predetermined speed. Thus, no effort is made in Girin to optimize fuel efficiency or torque. Girin nowhere suggests that a walking beam and movable fulcrum arrangement may be advantageously used to control output characteristics in a cooperative manner with a prime mover supplying a controllably varied output. Instead, the device is only used to directly control output speed independent of the functioning of the prime mover.

It has occurred to the Applicant in the present application that a variable fulcrum walking beam may be advantageously used to achieve improvements in fuel efficiency in fossil fuel combustion engines. This is particularly true if appropriate controls are provided to optimize the transmission ratio in response to conditions in the prime mover, and possibly in response to additional input supplied by other devices used in conjunction with the internal combustion engine and from the human operator of the internal combustion engine. Such a device would be particularly useful in a motor vehicle in order to improve the fuel efficiency of the internal combustion engine of the motor vehicle. However, in order to be satisfactory for use in a motor vehicle, such a device must be made in a compact, lightweight and inexpensive form and must be capable of smoothly and efficiently delivering power from an internal combustion engine to the wheels of a motor vehicle.

The need for a fuel efficient transmission for motor vehicles has increased recently as a result of the dramatic increase which has occurred in the cost of fuel, as well as the imminent shortage of fuel which is being predicted by many independent sources. Thus, an efficient and lightweight infinitely variable transmission is needed. Furthermore, as a result of the need to conserve fuel, the internal combustion engines in motor vehicles have become smaller and smaller and, accordingly, the output of internal combustion engines in typical vehicles has decreased. While various modifications to the internal combustion engine itself have been made to permit an increase in the amount of torque and power available from a particular engine, many of the vehicles still have undesirably sluggish performance as a result of the downsized engines. The dual problems of increased fuel prices and sluggish performance have resulted in a reversal of the previous trend away from manual transmissions to automatic transmissions.

Accordingly, it is highly desirable to provide an automatic infinintely variable transmission which provides sufficient torque to overcome the sluggishness problem of current motor vehicles using discrete automatic transmissions. What is also needed is a method and apparatus for directly controlling an infinitely or continuously variable transmission for a motor vehicle in response to vehicle and, possibly, operator inputs so as to optimize the operation of the internal combustion engine of the vehicle under varying conditions.

SUMMARY OF THE PRESENT INVENTION

The present invention provides an infinitely variable transmission overcoming many of the above described shortcomings of prior transmissions. Furthermore, the present invention provides a method and apparatus for controlling continuously variable transmissions in response to predetermined parameters of a prime mover, such as the manifold pressure of an internal combustion engine, to optimize fuel efficiency yet provide improved responsiveness of the driven device to sudden demands for increased output.

The infinitely variable transmission of the present invention includes a driving shaft having at least one cam mounted thereto and a driven shaft having at least one one-way clutch mounted thereto and a gear mounted to the one-way clutch. A lever having a movable fulcrum is provided between the driving and driven shafts and includes a cam follower at one end engaging the cam and a rack at the other end engaging the gear so as to deliver power from the driving shaft to the driven shaft. The position of the fulcrum is varied in order to change the transmission ratio.

In a preferred embodiment, the lever consists of a beam having an elongated portion and a pair of spaced apart flanges extending therefrom. The cam and a movable fulcrum block are each provided between the flanges. The movable fulcrum block is movable between a position in alignment with a pivoting point of the rack to positions intermediate the pivoting point and the driving shaft so as to vary the transmission ratio. Furthermore, in the preferred embodiment, a plurality of cams, one-way clutches, gears, levers, and racks are used. Preferably, each lever is provided with two racks, each of the two racks cooperating with one of a pair of gears mounted on oppositely oriented one-way clutches so that the lever will drive the driven shaft in each direction of oscillation.

The method and apparatus for controlling an infinitely variable transmission, according to the present invention, provides for varying the transmission ratio of an infinitely variable transmission in response to preselected parameters of an internal combustion operation, preferably the intake manifold pressure. Thus, the operator of the motor vehicle would control the fuel/air mixture delivered to the internal combustion engine in a conventional manner and the transmission would select an appropriate gear ratio in response to engine parameters to optimize either fuel efficiency or torque. In the preferred embodiment, the method and apparatus for controlling an infinitely variable transmission according to the present invention includes a cylinder and piston driven by pressure supplied, for example, by the oil pump, to displace the fulcrum. A valve is provided responsive to a vacuum gage measuring the intake manifold pressure, the valve regulating the supply of pressurized fluid to the cylinder. The valve may be mechanically linked to the vacuum gage. Alternatively, a microprocessor control may be provided between the vacuum gage and the valve so as to selectively permit reprogramming the control assembly to respond to other parameters of operation of the internal combustion engine or to various inputs supplied by the driver.

It is, accordingly, a primary object of the present invention to provide an infinitely variable transmission for efficiently transferring power from a prime mover to a driven device. This is accomplished by the present invention by providing a compact and lightweight infinitely variable transmission which positively links a driving shaft with a driven shaft. This object is further achieved by providing an efficient and effective automatic control apparatus for controlling the transmission ratio. It is further achieved by providing a variable fulcrum walking beam transmission having the walking beam, or lever, disposed generally between the driving shaft and the driven shaft, rather than displaced therefrom. The efficiency of this device is enhanced by the use of multiple levers and multiple racks per lever and by varying the fulcrum location in response to intake manifold pressure.

Another object of the present invention is to provide a method and apparatus for controlling any infinitely variable transmission and, particularly, for controlling the novel infinitely variable transmission disclosed herein using a variable fulcrum walking beam.

Still another object of the present invention is to provide a control apparatus for an infinitely variable transmission which permits reprogramming of the response of the movable fulcrum to exhaust manifold pressure in response to other preselected parameters, including driver input. This object is accomplished by the use of a microprocessor control between the intake manifold vacuum gage and the apparatus for moving the fulcrum point.

These and many other objects, features, and advantages of the present invention will become apparent to those skilled in the art when the following detailed description of the preferred embodiment is read in conjunction with the attached drawings.

BRIEF DESCRIPTION OF THE DRAWINGS

In the drawings appended hereto:

FIG. 4 is a side elevational view thereof;

FIGS. 5 and 6 are schematic side views similar to portions of FIG. 4 but illustrating the infinitely variable transmission thereof with the fulcrum point in the neutral position and a power transmitting position, respectively;

FIG. 9 is a schematic view of an electromagnetic servo mechanism for controlling an infinitely variable transmission according to the present invention;

FIG. 10 is a schematic view of a direct acting governor for controlling an infinitely variable transmission according to the present invention.

DETAILED DESCRIPTION OF THE PREFERRED EMBODIMENT

Figure 7:
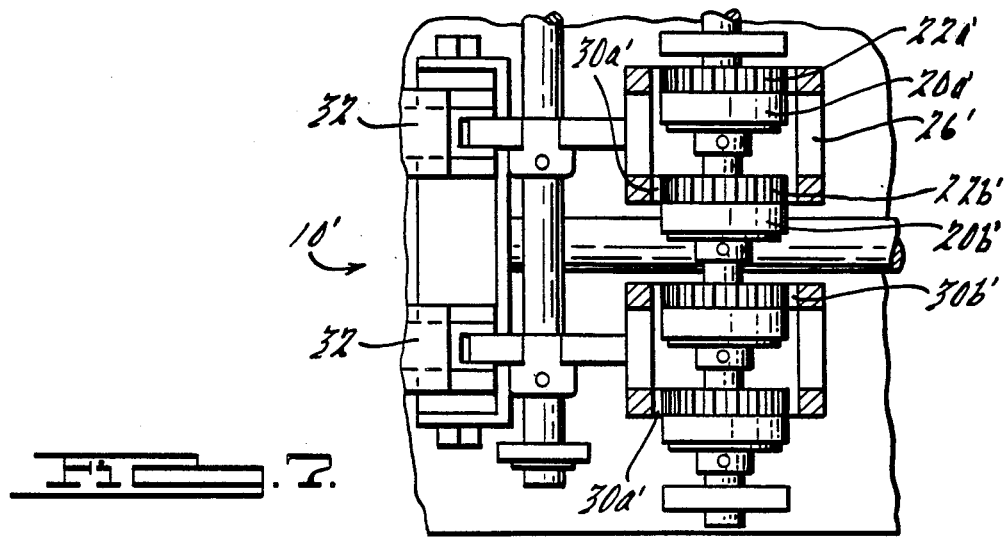
FIG. 7 is a partial top view similar to FIG. 2 but illustrating a modified infinitely variable transmission according to the present invention.
Figure 8:
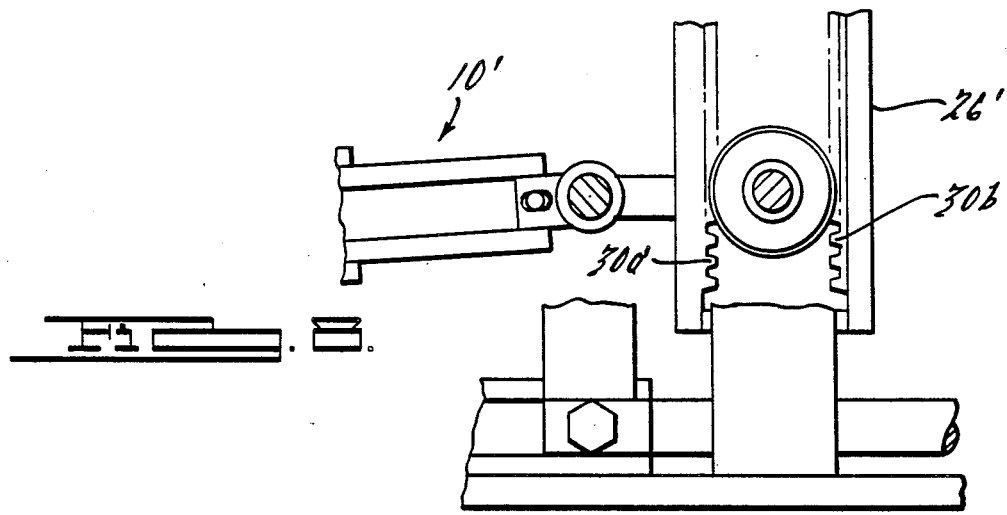
FIG. 8 is a side view of the modified infinitely variable transmission of FIG. 7.

Referring now to the drawings, there are illustrated examples of structure for an infinitely variable transmission 10, FIGS. 1 through 6, or 10', FIGS. 7 and 8, and examples of structure for a control apparatus 12, FIG. 9, and 12', FIG. 10. It will be appreciated by those skilled in the art that many modifications and variations may be made from the structure illustrated therein without departing from the spirit of the present invention.

Referring particularly to FIGS. 1 through 6, a single acting infinitely variable transmission 10 is illustrated. A driving shaft 14 is provided with rotary motion by a prime mover, such as an internal combustion engine. The driving shaft 14 may be, for example, the crankshaft of a motor vehicle or may be coupled thereto by appropriate means. A plurality of cams 16 are mounted to the driving shaft 14 and are rotated thereby. In the preferred embodiment, the cams 16 consist of eccentrically mounted discs. A driven shaft 18 is provided parallel to the driving shaft 14 and spaced away therefrom.

Figure 1:
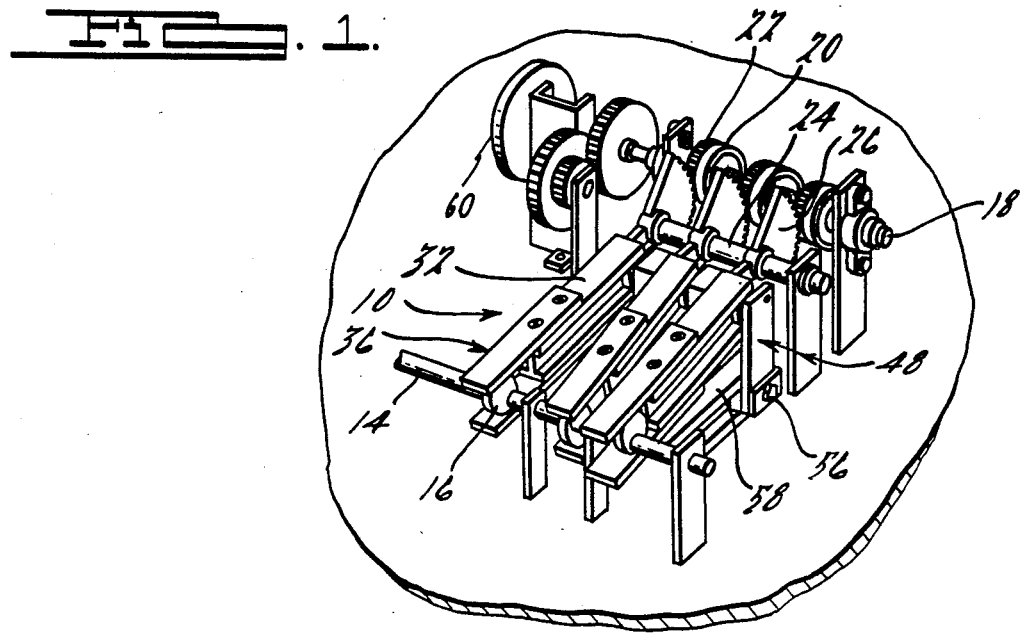
FIG. 1 is a perspective view of an example of structure of an infinitely variable transmission according to the present invention.
Figure 2:
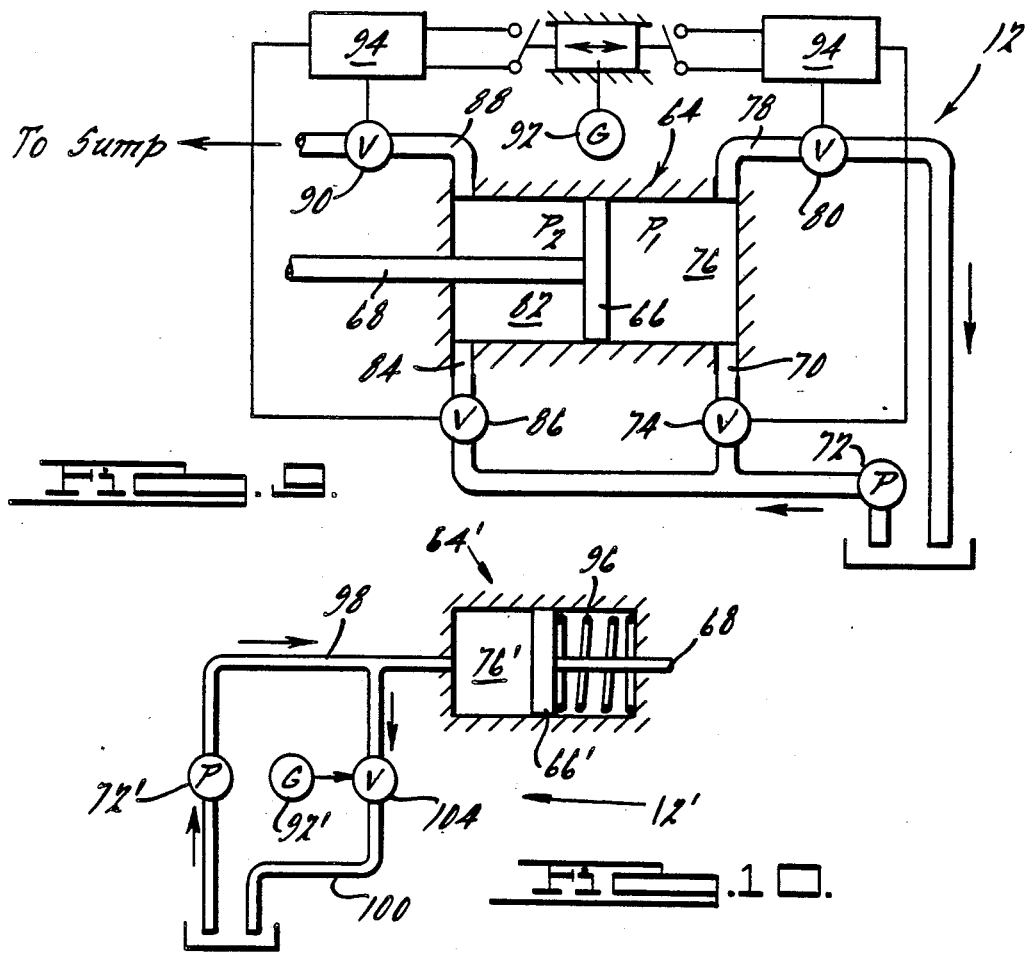
FIG. 2 is a top plan view thereof illustrating the lever pivot subassembly in a neutral position in solid line and in a power transmitting position in phantom line.
Figure 2:
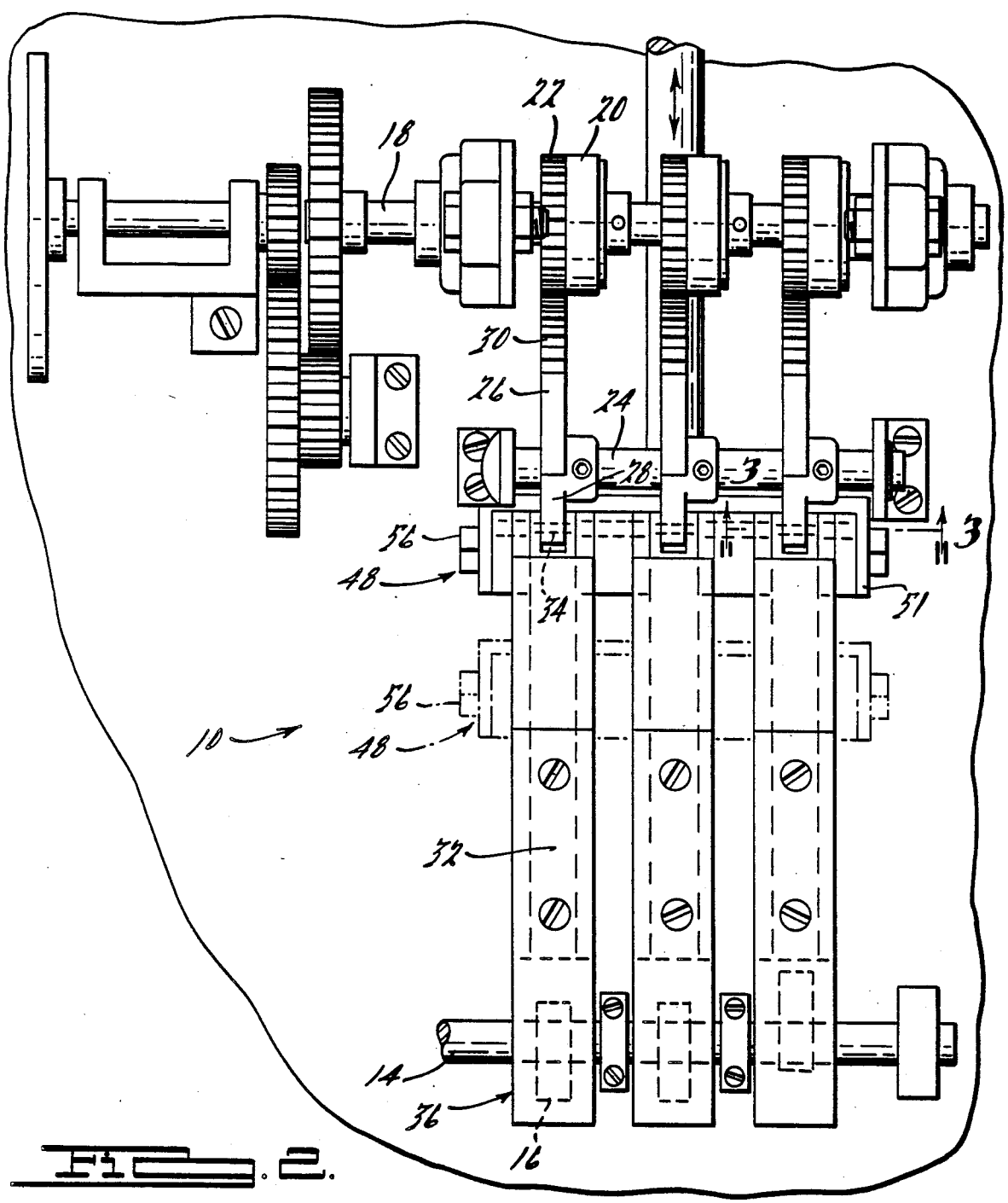

A plurality of one-way clutches 20, FIGS. 1 and 2, are mounted to the driven shaft 18. A gear 22 is mounted to each of the one-way clutches 20 such as to permit the gear 22 to drive the driven shaft 18 in one angular direction.

An intermediate shaft 24 is disposed parallel to and between the driving shaft 14 and the driven shaft 18. A plurality of racks 26 are pivotally mounted to the intermediate shaft 24 and extend therefrom into engagement with the gear 22. In the example of structure illustrated in FIGS. 1 through 6, the racks 26 each consist of a segment of a circular gear. Each rack 26 also has of an arm 28 extending radially outwardly from the intermediate shaft 24 opposite the teeth 30 of the rack.

A walking beam or lever 32 is pivotally mounted to the arm 28 of each of the racks 26 by means of a pivot pin assembly 33, shown in FIGS. 4 through 6. As will be appreciated by those skilled in the art, the pivot pin assembly 33 preferably consists of a pin 34 movably disposed in a slot 35, as shown in FIG. 5, to faciliate the smooth pivoting motion of the rack 26 and the lever 32 about different pivot points. Furthermore, an elongated sliding member, not illustrated, may be provided between the pin 34 and the slot 35 to provide an increased surface area of contact therebetween, the sliding member being slidingly engaged with the slot while the pin is pivotally mounted to the sliding member.

In the single acting infinitely variable transmission 10 illustrated, the lever 32 consists of an elongated member having generally the shape of an "I" beam. That is, each lever 32 has an elongated portion 38 and a pair of parallel flanges 40 and 42 extending therefrom, FIG. 4. Cam follower means 36 are provided at the end of the lever 32 opposite the pivot pin 34. Each cam follower means engages one of the cams 16. The cam follower means 36 illustrated consists of a pair of oppositely disposed plates 44 and 46, each mounted by appropriate means to one of the flanges 40 and 42 so as to surround the cam 16. If desired, the cam follower means may be formed integrally with the lever and may consist of extensions of the flanges 40 and 42. Alternately, the plates 44 and 46 may be formed from a single U-shaped stamping, not illustrated, fitted over the lever 32 and closing the end 43 thereof.

Figure 3:
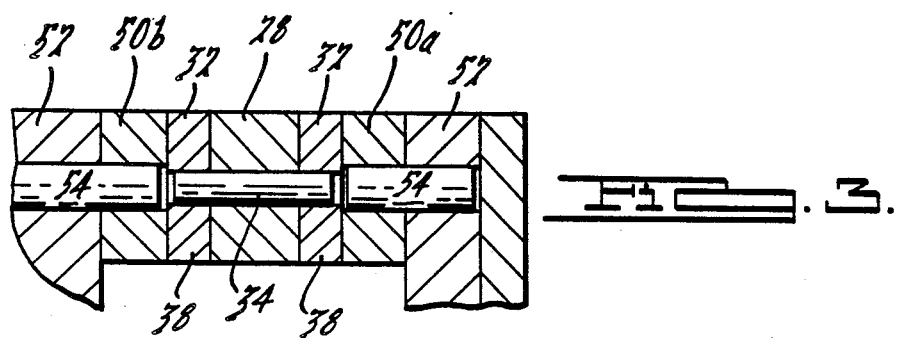
FIG. 3 is a sectional view taked along lines 3—3 of FIG. 2.

A lever pivot subassembly 48 is provided between the driving shaft 14 and the driven shaft 18. In the example illustrated, the lever pivot subassembly 48 consists of a plurality of blocks 50 each slidingly disposed between the flanges 40 and 42 of one of the levers 32. As shown in FIG. 3, two blocks 50a and 50b may be used on opposite sides of the elongated portion 38 of each lever 32. Each block 50, or 50a and 50b, is pivotally mounted to a standard 52 by means of a pin 54. Each of the pins 54 are axially aligned so as to cooperate together to define a pivot axis for the lever 32. A bracket 51 secures the standards 52 and the levers 32 together such as to permit sliding movement therebetween. Each of the standards 52 extends away from the plane defined by the driving shaft 14 and the driven shaft 18 and are rigidly interconnected by means of a link 56, shown in FIGS. 1, 2 and 4. A guide subassembly 58 is provided to permit selective displacement of the lever pivot subassembly 48 towards and away from the driving shaft 14.

From the above description, the operation of the single acting infinitely variable transmission will now be apparent to those skilled in the art. The pins 54 define a pivoting axis for each of the levers 32. The levers 32 are driven to pivot about that axis by the driving shaft 14 due to the cooperation of the cam follower means 36 with the cam 16. Preferably, each of the individual cams 16 are oriented at a different angular position relative to the driving shaft 14 so as to vary the phase angle between the various levers 32. The oscillatory pivoting motion of the lever 32 about the pins 54 causes a pivoting motion of the pivot pin 34 interconnecting the lever with the rack 26, thereby causing a similar oscillatory motion of the rack 26. The oscillatory motion of the rack 26 drives the driven shaft 18 to rotate in a predetermined angular direction due to the one-way clutch 20. Together, the levers 32 drive the driven shaft to rotate at an even speed, due to the differing phase angles of the cams 16. Accordingly, power may be taken off the driven shaft 18, as desired. A flywheel 60 may optionally be provided to further smooth out high frequency oscillations in the angular rotational speed of the driven shaft 18.

The lever pivot subassembly 48 may be selectively displaced in a direction parallel to the plane defined by the driving shaft 14 and the driven shaft 18, as indicated by the arrow 62 in FIG. 4, to vary the fulcrum point defined by the pin 54. Varying the fulcrum point will vary the speed ratio between the driving shaft 14 and the driven shaft 18. Thus, if the infinitely variable transmission 10 is to be used as a speed control device taking power off a motor running at full throttle, for example, a manual speed control may be obtained by manually displacing the lever pivot subassembly 48.

As best shown in FIGS. 3 and 5, the levers 32 and the lever pivot subassembly 48 may be designed so as to permit displacement of the pins 54 to a point where they become aligned with the pivot pins 34. In this neutral position, no power is transferred from the driving shaft 14 to the driven shaft 18. Thus, an idling condition may be obtained without disengaging the racks 26 from the gears 22. The transition, therefore, between a driving condition, as illustrated in FIG. 6, and an idling condition, as illustrated in FIG. 5, requires no clutching operation.

A double acting infinitely variable transmission 10' is illustrated in FIGS. 7 and 8. The double acting infinitely variable transmission is identical to the single acting infinitely variable transmission except as described below.

The double acting infinitely variable transmission 10' is provided with two one-way clutches 20a' and 20b' for each lever 32. The one-way clutches 20a' and 20b', associated with a single lever 32, are oppositely oriented so as to drive the driven shaft 18 in opposite directions. Each of the one-way clutches 20a' and 20b' is coupled to a gear 22a' and 22b', respectively. Each of the racks 26' is provided with a first set of teeth 30a' disposed between the driven shaft 18 and intermediate shaft 24 and engaging one of the gears 22a'. Each of the racks 26' is also provided with a second set of teeth 30b disposed on the opposite side of the driven shaft 18 from the intermediate shaft 24 and engaging the other gear 22b'. Thus, as a result of the oppositely oriented one-way clutches 20a' and 20b', the rack 26' will drive the driven shaft 18 through one of the gears 22a' in one direction of motion and will drive the driven shaft 18 through the other gear 22b' in the other direction of motion. Thus, the double acting infinitely variable transmission 10' further reduces the high frequency oscillation which occurs in the rotational speed of the driven shaft 18.

Referring now to FIG. 9, a control apparatus 12 for an infinitely variable transmission according to the present invention is illustrated. The control apparatus 12 includes a cylinder 64 having a piston 66 disposed therein. The piston is interconnected by means of a rod 68 with the lever subassembly 48 such that displacement of the piston 66 results in similar displacement of the fulcrum point for each of the levers 32. A chamber 76 on one side of the piston 66 is pressurized to a pressure P1 by means of a supply line 70 interconnected with a pump 72. The pump 72 may be an existing pump, such as the oil pump of a motor vehicle, supplying pressurized fluid to other components of the motor vehicle. A normally opened valve 74 is provided along the supply line 70. An outlet line 78 vents the chamber 76 and is provided with a normally closed valve 80.

A chamber 82 on the side of the piston opposite the chamber 76 is similarly pressurized to a pressure P2 provided with a supply line 84 leading to the pump 72 and with a normally closed valve 86. Another outlet line 88 vents the chamber 82 through a normally closed valve 90.

A vacuum gage 92 measures the intake manifold pressure and sends one or more signals corresponding thereto to a microprocessor 94 which selectively directs the opening and closing of the valves 74, 80, 86 and 90 so as to regulate the pressures P1 and P2. The pressure differential between the chambers 76 and 82 thereby causes a preselected displacement of the piston, which drives the lever pivot subassembly 48 to move. As described above, the position of the lever pivot subassembly 48 determines the location of the fulcrum point for the levers 32 and, thus, the microprocessor 94 controls the transmission ratio.

It will be readily appreciated by those skilled in the art that the microprocessors 94 may receive and respond to various types of signals. For example, and as illustrated schematically in FIG. 9, the microprocessor may respond to two different signals, one corresponding to exhaust manifold pressure in excess of a first predetermined amount and the other corresponding to exhaust manifold pressure being less than a second predetermined amount, the second predetermined amount being smaller than the first predetermined amount. Alternatively, the microprocessor could respond to the actual value of the intake manifold pressure, converted to digital form by any convenient method, rather than merely the two above described discrete values. Additionally, the microprocessor could be designed so as to respond to additional input variables, such as oil temperature, air temperature, the length of time the vehicle has been running, and specific signals from the driver.

Referring now to FIG. 10, an alternate control apparatus 12' is illustrated. The control apparatus 12' is a direct acting governor having a cylinder 64' and piston 66' responsive to the differential in force between a pressure chamber 76' on one side of the piston 66' and a spring 96 on the other side of the piston. The pressure chamber 76' is pressurized by a line 98 leading from the pump 72'. A bleed line 100 extends from the line 98 to vent pressure in the line 98 through a normally open valve 104. The valve 104 is selectively closed in response to a vacuum pressure gage 92' which detects a drop in the intake manifold vacuum pressure beyond a predetermined amount, such as one inch of mercury (1 in. Hg).

Thus, when the intake manifold pressure decreases by the predetermined amount, the valve 104 closes such as to increase the pressure in the chamber 76' and, accordingly, to displace the piston 66' to adjust the fulcrum point of the lever 32.

Figure 11:
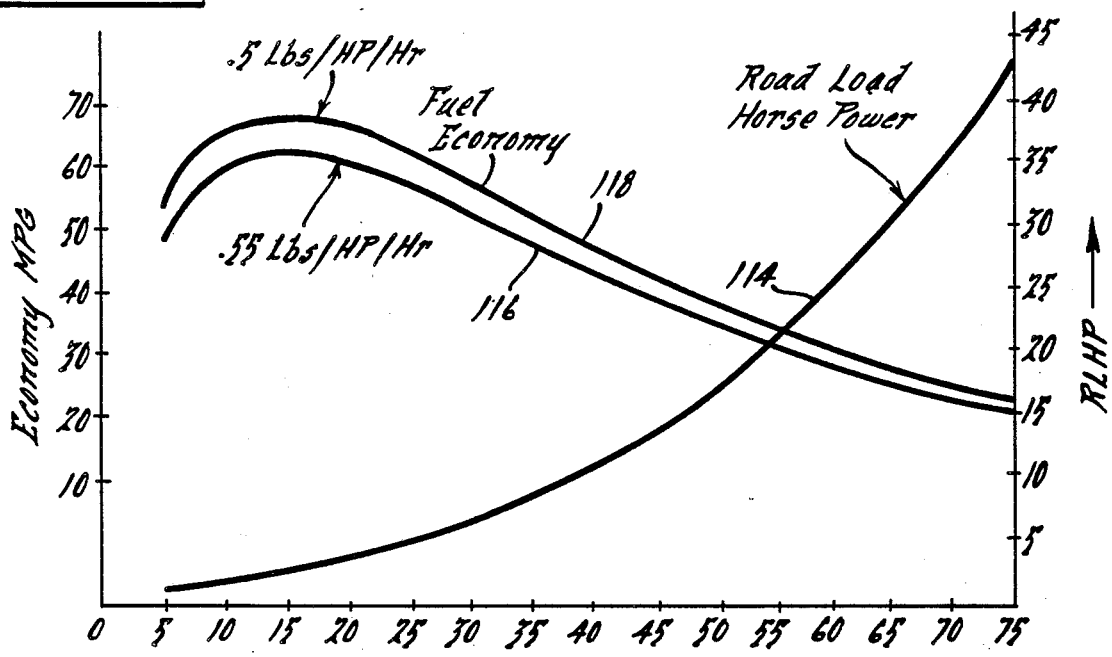
FIG. 11 is a graphical representation illustrating theoretical performance predicted for an infinitely variable transmission constructed according to the present invention.

FIG. 11 illustrates the predicted performance of an infinitely variable transmission 10 or 10' according to the present invention. A curve 114 represents the road load horsepower required for a typical motor vehicle while curves 116 and 118 represent predicted fuel consumption of a vehicle based on the road load horsepower and the specific fuel chosen.

It will be appreciated by those skilled in the art that many modifications and variations may be made from the structures described above within the spirit of the present invention. For example, the oscillatory motion of the levers 32 may be provided by means other than the driving shaft 14 and the cam 16. More particularly, the levers 32 may each be interconnected with one of the cylinders of an internal combustion engine, for example, through a suitable crank arrangement. The transmission may, therefore, be provided within the engine block of the vehicle and the crankshaft and, if needed, could be substantially reduced in weight and size. A second similar transmission may be provided to drive a second output shaft at a substantially constant speed independent of engine and vehicle speeds, the second output shaft being used to drive accessories.

Similarly, more or fewer levers 32 may be used, depending on the need. For example, the use of three levers may be required for a single acting infinitely variable transmission, each having a phase angle of one hundred and twenty degrees (120°) away from the other levers. On the other hand, in a double acting infinitely variable transmission, two levers 32 having phase angles differing by ninety degrees (90°) may be sufficient since each lever works in both directions.

It will be further appreciated by those skilled in the art that the present invention may be combined with existing fuel economy and pollution regulation apparatus to further enhance the function of a motor vehicle. For example, if a microprocessor 94 is used to control the transmission ratio, the same microprocessor may be used to measure a variety of motor vehicle parameters and regulate a variety of motor vehicle functions so as to optimize each of the controllable parameters. For example, the microprocessor could receive information relating to various temperature and pressure levels as well as driver inputs and control the selection of the transmission ratio, fuel metering, engine timing and cooling systems. It will further be appreciated by those skilled in the art that vehicle accessories may be driven by the crankshaft or the transmission output shaft, depending on their speed, through an overrunning clutch mechanism. The transmission of the present invention may be used on a single shaft gas turbine engine. In this event, the control of the pivot point may be regulated in response to the turbine temperature and turbine speed and no power turbine is required. Alternatively, the transmission of the present invention may be used in conjunction with a flywheel drive assembly. In this event, the transmission ratio will be controlled in response to the current speed of the flywheel to maintain constant vehicle speed.

The above description and the appended drawings are offered by way of example and illustrate the best mode contemplated by the inventor for carrying out the present invention at the time of filing. Many additional modifications and variations will be apparent to those skilled in the art after having the benefit of reading the disclosure of the present invention. These modifications and variations are included within the intended scope of the claims appended hereto.

What is claimed as novel is as follows:

1. An infinitely variable transmission comprising:
    a driving shaft;
    a driven shaft parallel to said driving shaft;
    cam means on said driving shaft;
    fulcrum means interposed said driving shaft and said driven shaft;
    fulcrum moving means selectively operable to move said fulcrum means along a line between said driving shaft and said driven shaft;
    lever means pivotally interconnected with said fulcrum means, said lever means being in the form of a beam and having a first end, a second end, an elongated portion and a pair of spaced apart flanges extending therefrom, said cam means being trapped between said pair of spaced apart flanges, said pair of spaced apart flanges acting as cam follower means;
    cam follower means on said first end of said lever means and disposed adjacent said cam means and engaged therewith such that said first end of said lever means is oscillated about said fulcrum means by said cam means upon rotation of said driving shaft;
    one-way clutch means mounted to said driven shaft;
    gear means mounted to said one-way clutch means;
    intermediate shaft means disposed between said driving shaft and said driven shaft and parallel thereto; and
    rack means pivotally mounted to said intermediate shaft means, said rack means further being pivotally interconnected with said second end of said lever means and further engaging said gear means such that, upon oscillation of said lever means, said rack means is driven thereby to pivot about said intermediate shaft means to drive said driven shaft through said gear means to rotate in a first predetermined angular direction, the angular speed of said driven shaft being determined by the angular speed of said driving shaft and the location of said fulcrum means.

2. The infinitely variable transmission of claim 1 wherein said fulcrum means comprises:
    a block movably fitted between said flanges;
    a standard pivotally interconnected with said block and extending away therefrom; and
    guide means for said standard.

3. An infinitely variable transmission for delivering power from a power source delivering oscillatory reciprocating motion to a driven shaft, said infinitely variable transmission comprising:
    two one-way clutch means mounted to said driven shaft for rotation therewith;
    two gear means, one gear means mounted to one of said two one-way clutch means, the other gear means mounted to the other of said two one-way clutch means;
    lever means having a first end and a second end opposite said first end, one of said first end and said second end being interconnected with said power source such that said power source reciprocates the other of said first end and said second end, one of said two one-way clutch means being actuated by said lever means as said other of said first end and said second end of said lever means moves in a first direction, the other of said two one-way clutch means being actuated by said lever means as said one of said first end and said second end of said lever means moves in a second direction;
    two rack means, each of said two rack means being pivotally interconnected with said other of said first end and said second end of said lever means, one of said rack means cooperating with one of said gear means such that said one of said rack means drives said driven shaft to rotate in a predetermined direction when said one of said first end and said second end of said lever means moves in one direction, the other of said rack means cooperating with the other of said gear means such that said other of said rack means drives said driven shaft to rotate in said predetermined direction when said other of said first end and said second end of said lever means moves in the direction opposite said one direction;
    movable fulcrum means supporting said lever means, said movable fulcrum means being movable between a first extreme position and a second extreme position along said lever means to vary the ratio between the maximum displacement of said one of said first end and said second end relative to the maximum displacement of said other of said first end and said second end and, thereby, to vary the speed of said driven shaft relative to the speed of said oscillatory reciprocating motion; and
    condition responsive fulcrum moving means for moving said movable fulcrum means in response to preselected parameters of said power source.

4. The infinitely variable transmission of claim 3 wherein said driven shaft has a first side and a second side and wherein said two rack means form a unitary element having:
    a mounting portion pivotally interconnected with said driven shaft;
    a first rack disposed on said first side of said driven shaft and engaging one of said gear means; and
    a second rack disposed on said second side of said driven shaft and engaging the other of said gear means.

5. The infinitely variable transmission of claim 3 wherein each of said two rack means pivots about a preselected pivot point and further wherein said movable fulcrum means is movable to a neutral position aligned with said preselected pivot point such that no power or motion is delivered to said driven shaft in said neutral position.

6. The infinitely variable transmission of claim 3 wherein said power source comprises an internal combustion engine and wherein said preselected parameter comprises intake manifold pressure.

7. The infinitely variable transmission of claim 6 wherein said fulcrum moving means comprises direct acting governor means displacing said movable fulcrum means in response to the value of said intake manifold pressure.

8. The infinitely variable transmission of claim 6 wherein said fulcrum moving means comprises:
    cylinder moving means having outlet means and further having inlet means interconnected with a source of pressurized fluid;
    piston means movably disposed within said cylinder moving means, said piston means being interconnected with said movable fulcrum means;

vacuum gage means measuring said intake manifold vacuum pressure; and valve means interposed said cylinder moving means and said source of pressurized fluid, said valve means being responsive to said vacuum gage means to vary the pressure on at least one side of said piston means to regulate the position of said piston means and, therefore, to displace said movable fulcrum means in response to said intake manifold pressure.

9. The infinitely variable transmission of claim 8 wherein said valve means is mechanically linked to said vacuum gage means.

10. The infinitely variable transmission of claim 8 further comprising microprocessor control means interposed said vacuum gage means and said valve means.

* * * * *